Feb. 3, 1931.  C. M. CRONKHITE  1,791,122
OPERATING MECHANISM FOR DIRIGIBLE HEADLIGHTS AND THE LIKE
Filed Aug. 22, 1927
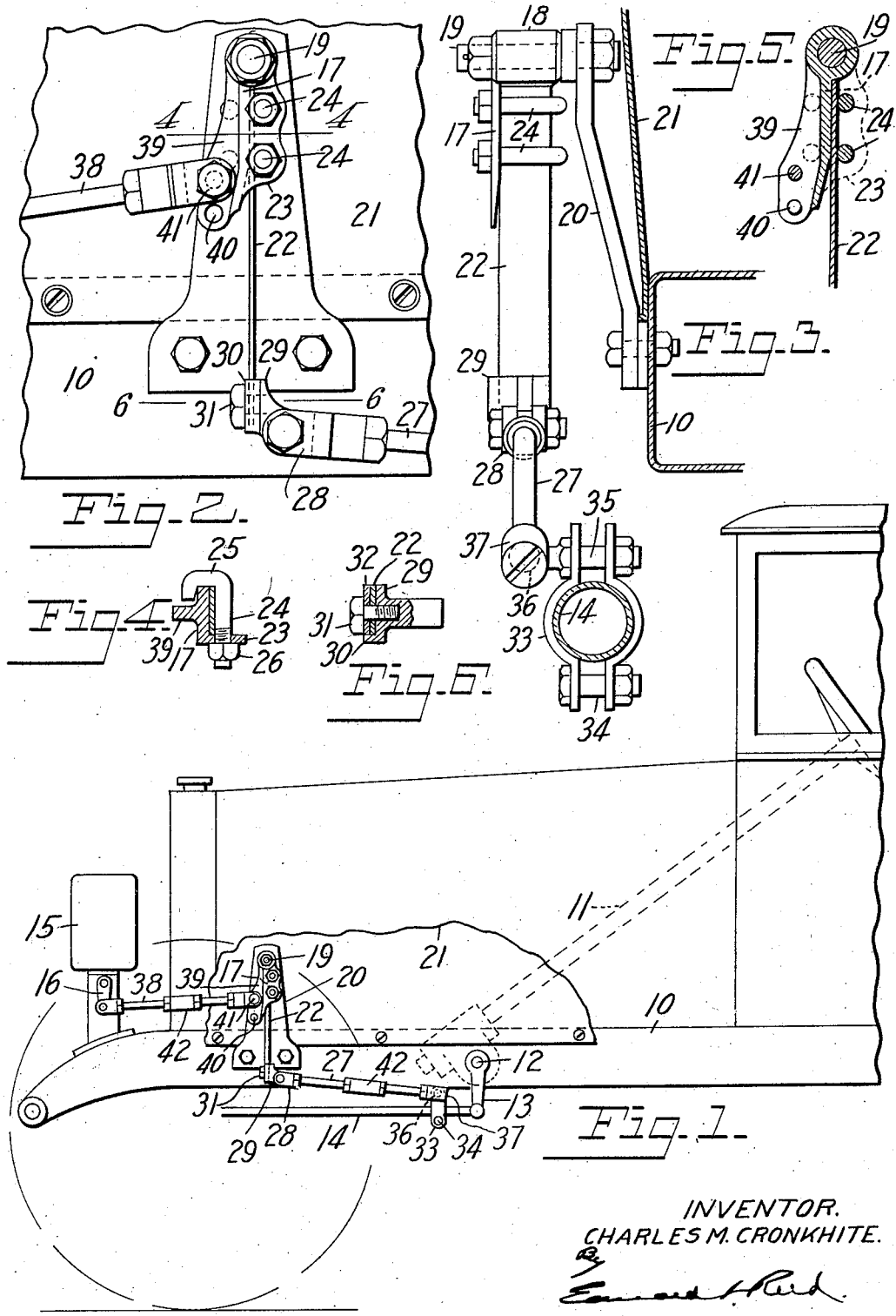
INVENTOR.
CHARLES M. CRONKHITE.
ATTORNEY.

Patented Feb. 3, 1931

1,791,122

UNITED STATES PATENT OFFICE

CHARLES M. CRONKHITE, OF GLENDALE, CALIFORNIA, ASSIGNOR TO PILOT RAY CORPORATION, OF WILMINGTON, DELAWARE, A CORPORATION OF DELAWARE

OPERATING MECHANISM FOR DIRIGIBLE HEADLIGHTS AND THE LIKE

Application filed August 22, 1927. Serial No. 214,581.

This invention relates to operating mechanism for dirigible headlights and the like and more particularly to a device for connecting a dirigible headlight with the steering mechanism or other movable part of an automobile by means of which the headlight is to be operated.

One object of the invention is to provide such a connecting device which will be adjustable to accommodate it to varying distances between the headlight and the steering mechanism, thus enabling the connecting device to be applied to automobiles of various types and sizes.

A further object of the invention is to provide such a connecting device with means for absorbing the minor movements or vibrations of the steering mechanism or other actuating device and preventing such minor movements from being transmitted to the headlight or other part to be operated.

A further object of the invention is to provide such a device which will be very simple in its construction and operation and which can be quickly and easily installed on automobiles.

Other objects of the invention will appear as the device is described in detail.

In the accompanying drawings Fig. 1 is a side elevation of a portion of an automobile, partly broken away, showing the connecting device in elevation; Fig. 2 is a side elevation of the connecting device with the connecting rods partly broken away; Fig. 3 is a rear elevation of the connecting device; Fig. 4 is a section taken on the line 4—4 through the pivoted member of the connecting device; Fig. 5 is a vertical sectional view of the pivoted member of the connecting device; and Fig. 6 is a section taken on the line 6—6 of Fig. 2.

In these drawings I have illustrated one embodiment of my invention and have shown the same as applied to a passenger automobile but it will be understood that the invention may take various forms and that it may be applied to automobiles of various types or to other mechanisms in which a part to be operated is to be connected with a movable device constituting the actuating means therefor.

In that particular embodiment here illustrated I have shown the connecting device as installed upon a passenger automobile comprising a main frame 10 and having the usual steering mechanism consisting of the steering rod 11, transverse shaft 12, rock arm 13 and connecting rod 14 which is connected at its forward end with steering knuckles of the front wheels, these connections not being here shown. Mounted at the front of the automobile and, in the present instance, upon the side members of the frame 10, are dirigible headlights, one only of these headlights being here shown at 15. This headlight is mounted for movement about a vertical axis and the means for so moving the same comprises a crank arm 16. It will be understood, of course, that the headlight and the means for turning the same may be of any suitable character. Dirigible headlights are usually actuated from a movable part of the steering mechanism and ordinarily either the rock arm 13 or the connecting rod 14 are utilized for this purpose.

As here shown, the connecting device comprises a pivoted member which is mounted on a fixed support and is connected at separated points with the headlight and with the steering mechanism, the connecting means being adjustable and the pivoted member having a yieldable part interposed between the points at which it is connected with the headlight and with the steering mechanism, thus allowing the same to yield and thereby absorb the vibrations or minor movements of the steering mechanism. As here shown, this pivoted member comprises a rigid portion or arm 17 having at its upper end an apertured portion or bearing 18 adapted to receive a stud or bolt 19 which extends through the same and through a fixed support which, in the present instance, is in the form of a rigid bracket 20 bolted to the side member of the frame 10, this bracket having its upper portion slightly offset to accommodate the same to the inner portion of the fender, which is shown at 21. Connected with the rigid arm 17 is a yieldable member preferably in the form of a resilient bar 22 and which is here shown as a flat spring. This yieldable member has its upper portion rigidly secured to the arm 17 and extends downwardly for a considerable distance below that arm. The connection between the resilient arm and the rigid arm of the pivoted device may take various forms but, as here shown, the rigid arm 17 has a flat rear face and is provided at one edge with a rearwardly extending flange 23, the flange and face of the arm forming a seat for the resilient bar 22 and the flange serving to hold that arm against lateral displacement. Bolts 24 extend through the flange 23 and are provided with hook-shaped ends 25 which engage over the edges of the resilient bar and of the arm 17, the hook shaped portion being preferably so shaped as to engage these parts with a wedging action and thereby rigidly clamp the resilient bar against the arm when the nuts 26 on the bolts are tightened down. The lower portion of the rigid arm is preferably inclined with relation to the flat rear face thereof so that the resilient arm may yield or bend about the angle thus formed but will engage the inclined surface which will check its bending movement and stiffen the bar. Near its lower end the resilient bar is connected with a movable part of the steering mechanism, the connecting means preferably comprising a connecting rod 27 having at its forward end pivot lugs 28 by means of which it is connected with a bracket or socket member 29 which in turn is secured to the lower end of the resilient bar 22. As here shown, this socket member has a flat forward face and is provided at one edge with a flange 30 to engage the edge of the bar and hold the same against lateral displacement. A bolt 31 extends through the end of the bar and is threaded into the socket member and preferably a clamping plate 32 is interposed between the head of the bolt and the bar. The rear end of the connecting rod 27 is provided with means for connecting it either with the connecting rod 14 or the rock arm 13 of the steering mechanism and to this end the end of the rod 27 is pivotally connected with a clamping member 33 which is here shown as mounted on the rod 14 of the steering mechanism adjacent to the rock arm 13. This clamping member may be of any suitable character but, as here shown, it comprises opposed clamping plates arranged on the opposite sides of the movable part of the steering mechanism and connected one to the other by bolts 34 and 35. The bolt 35 has at one end thereof a spherical head 36 which is seated in a socket member 37 screw threaded onto the end of and forming a part of the connecting rod 27, thus establishing a universal connection between the connecting rod and the movable part of the steering mechanism. The pivoted member is also connected with the headlight and preferably this connection is between the headlight and the rigid arm 17 of the pivoted device. This connecting means also may comprise a connecting rod 38 having one end pivotally connected to the arm 17. Obviously the point of connection between the rod 38 and the arm 17 may be at any suitable point with relation to the axis of the arm, but usually it is located below that axis and the forward end of the rod 38 connected with a downwardly extending arm 16 on the headlight. In the present device the arm 17 has a forwardly extending vertical flange or rib 39 provided with a plurality of openings 40 to receive the bolt 41 by means of which the rod 38 is connected therewith thus enabling the rod to be connected with the arm at different distances from the axis of the pivoted device and enabling the amount of movement imparted to the connected rod by the pivoted device to be regulated. The forward end of the connecting rod 38 is pivotally connected with the crank arm 16 of the headlight. Both connecting rods 27 and 38 are provided with means, such as turn buckles 42, for adjusting their length so that the connecting device as a whole may be accommodated to automobiles of different types in which the distances between the movable part of the steering mechanism and the headlight varies.

It will be apparent that any movement imparted to the rock arm 13 and connecting rod 14 of the steering mechanism will be transmitted to the yieldable member or resilient bar 22 of the pivoted device or lever. The inertia or frictional resistance to the turning movement of the headlights will resist the movement of the lever or pivoted device by the steering mechanism and consequently the resilient bar 22 will yield under the influence of the initial movement of the steering mechanism and minor movements or vibrations thereof will not be transmitted to the headlights. When the movement imparted to the connecting rod 27 by the steering mechanism is sufficient to overcome the inertia or resistance of the headlights these headlights will be caused to move with the steering mechanism. As a result the headlights will be caused to move with the front or steering wheels of the automobile when these are turned but the vibrations or minor movements of the steering mechanism will be absorbed by the connecting device and the headlights will remain stationary until turning movement is imparted to the wheels.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device for connecting an operating device with a device to be operated, a rigid arm mounted for movement about a fixed axis, a resilient bar rigidly secured to said arm and extending beyond the free end thereof, means for connecting one of said devices with said arm at a point near the free end thereof, and means for connecting the other of said devices with said resilient bar at a point spaced from said arm.

2. In a device for connecting an operating device with a device to be operated, a resilient bar, means for pivotally mounting said bar for movement about a transverse axis, means for connecting said operating device with one side of said bar at a point remote from said axis, and means for connecting said device to be operated with the other side of said resilient bar at a point between said axis and the first mentioned point of connection.

3. In a mechanism comprising a part to be operated and a movable device by which said part may be operated, a rigid arm having means for pivotally mounting the same on a supporting structure and having a flange at one edge thereof, a resilient bar having one end engaging said rigid arm and having its other end extending beyond said arm, bolts extending through the flange of said rigid arm and having parts to engage the opposite edge of said arm and said bar to rigidly connect the same one to the other, means for connecting said rigid arm with the part to be operated, and means for connecting said resilient bar with said movable device.

4. In a mechanism comprising a part to be operated and a movable device by which said part may be operated, a rigid arm having means for pivotally mounting the same on a supporting structure and having a flange at one edge thereof, a resilient bar having one end engaging said rigid arm and having its other end extending beyond said arm, bolts extending through the flange of said rigid arm and having hook shaped end portions shaped to engage the opposite edge of said arm and said resilient bar with a wedging action to clamp the same one to the other, means for connecting said rigid arm with said part to be operated, and means for connecting said resilient bar with said movable device.

5. In a mechanism comprising a part to be operated and a movable device by which said part may be operated, a device having means for pivotally mounting the same on a supporting structure and having a rigid upper portion and a yieldable lower portion, a connecting rod having a socket member pivotally connected to the forward end thereof and adapted to receive the lower end of said yieldable member, means to rigidly secure said yieldable portion of said pivoted device in said socket member, means for connecting the rear end of said connecting rod with said movable device, and a second connecting rod to connect the rigid portion of said pivoted device with said part to be operated.

6. In a mechanism comprising a part to be operated and a movable device by which said part may be operated, a device having means for pivotally mounting the same on a supporting structure and having a rigid upper portion and a yieldable lower portion, a connecting rod having means for connecting one end thereof with the yieldable lower portion of said pivoted device, a clamping member adapted to be mounted on said movable device and comprising a bolt to secure the same thereto, said bolt having a spherical head, a socket member secured to the adjacent end of said connecting rod and adapted to receive the spherical head of said bolt, and means for connecting the rigid upper portion of said pivoted device with the part to be operated.

In testimony whereof, I affix my signature hereto.

CHARLES M. CRONKHITE.